US011783099B2

United States Patent
Tallman et al.

(10) Patent No.: US 11,783,099 B2
(45) Date of Patent: Oct. 10, 2023

(54) AUTONOMOUS SURROGATE MODEL CREATION PLATFORM

(71) Applicant: General Electric Company, Schenectady, NY (US)

(72) Inventors: James Albert Tallman, Glenville, NY (US); Eric Tucker, West Glenville, NY (US); Robert Zacharias, Saratoga Springs, NY (US); Andy Gallo, Duanesburg, NY (US); Vince Russo, Loudonville, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 535 days.

(21) Appl. No.: 16/051,753

(22) Filed: Aug. 1, 2018

(65) Prior Publication Data
US 2020/0042659 A1 Feb. 6, 2020

(51) Int. Cl.
*G06N 20/00* (2019.01)
*G06F 30/23* (2020.01)
(Continued)

(52) U.S. Cl.
CPC ............... *G06F 30/23* (2020.01); *G06N 7/08* (2013.01); *G06N 20/00* (2019.01);
(Continued)

(58) Field of Classification Search
CPC ....... G01N 29/4418; G01N 2035/0094; G01N 35/00584; G06N 7/00; G06N 7/06;
(Continued)

(56) References Cited

U.S. PATENT DOCUMENTS

| 3,555,252 A * | 1/1971 | Garden .............. G05B 13/0265 |
| | | 700/47 |
| 3,887,767 A * | 6/1975 | Miller ................... G06F 3/0386 |
| | | 178/18.09 |

(Continued)

FOREIGN PATENT DOCUMENTS

EP 3264338 A1 * 1/2018 ............. G06N 5/022

OTHER PUBLICATIONS

Cappos, Justin, Justin Samuel, Scott Baker, and John H. Hartman. "A look in the mirror: Attacks on package managers." In Proceedings of the 15th ACM conference on Computer and communications security, (ACM, 2008) pp. 565-574. https://doi.org/10.1145/1455770.1455841 (Year: 2008).*

(Continued)

*Primary Examiner* — Rehana Perveen
*Assistant Examiner* — Daniel E Miller
(74) *Attorney, Agent, or Firm* — Buckley, Maschoff & Talwalkar LLC (57) ABSTRACT

According to some embodiments, a surrogate model creation computer system includes a user interface to interact with a subject matter expert to create a scripted physics-based model workflow associated with an industrial asset. The surrogate model creation computer system further includes a surrogate model creation engine to automatically execute the scripted physics-based model workflow, in connection with a physics-based model of the industrial asset, to generate at least one response surface of the physics-based model workflow. The surrogate model creation engine may then use the response surface and a machine learning process to automatically create a surrogate model of the industrial asset. It may then be arranged to output the surrogate model for use by a substantially real-time analytics package associated with the industrial asset. According to (Continued)

some embodiments, scripting for a physics-based model workflow may also be automatically created.

20 Claims, 9 Drawing Sheets

(51) Int. Cl.
| | | |
|---|---|---|
| *G06N 7/08* | (2006.01) | |
| *G06F 111/06* | (2020.01) | |
| *G06F 111/20* | (2020.01) | |
| *G06F 111/10* | (2020.01) | |

(52) U.S. Cl.
CPC ....... *G06F 2111/06* (2020.01); *G06F 2111/10* (2020.01); *G06F 2111/20* (2020.01)

(58) Field of Classification Search
CPC ........ G06N 20/00; G06N 20/10; G06N 20/20; G06N 99/00; G06N 7/08; G06N 3/08; G06F 16/00; G06F 16/24561; G06F 2111/10; G06F 2111/20; G06F 30/23; G06F 2111/06; G06F 30/20; G06F 30/12; G16C 20/30; G16C 20/40; G16C 20/70; G16C 20/90; G16C 60/00; G05B 19/41885
See application file for complete search history.

(56) References Cited

U.S. PATENT DOCUMENTS

| | | | | |
|---|---|---|---|---|
| 4,024,508 | A * | 5/1977 | Bachman | G06F 16/9024 |
| | | | | 707/696 |
| 8,065,244 | B2 | 11/2011 | Chen et al. | |
| 9,187,984 | B2 | 11/2015 | Usadi et al. | |
| 9,811,074 | B1 | 11/2017 | Aichele et al. | |
| 10,102,316 | B2 * | 10/2018 | Van der Velden | G06F 30/20 |
| 11,003,815 | B2 * | 5/2021 | Ruoti | G06F 30/23 |
| 2003/0009317 | A1 * | 1/2003 | Dhir | G06F 30/00 |
| | | | | 703/7 |
| 2003/0060999 | A1 * | 3/2003 | Ogino | G01N 25/18 |
| | | | | 702/136 |
| 2011/0011595 | A1 | 1/2011 | Huang et al. | |
| 2011/0024125 | A1 * | 2/2011 | Wallace | G06G 7/57 |
| | | | | 703/10 |
| 2012/0158389 | A1 | 6/2012 | Wu et al. | |
| 2016/0371405 | A1 | 12/2016 | Raczynski et al. | |
| 2017/0293705 | A1 * | 10/2017 | Van der Velden | G06T 19/006 |
| 2017/0372196 | A1 * | 12/2017 | Traidia | G05B 23/0245 |
| 2018/0165604 | A1 * | 6/2018 | Minkin | G06N 5/022 |
| 2018/0210436 | A1 | 7/2018 | Burd et al. | |
| 2019/0181793 | A1 * | 6/2019 | Azad | H02S 50/15 |
| 2019/0236479 | A1 * | 8/2019 | Wagner | G06N 20/20 |
| 2019/0243933 | A1 * | 8/2019 | Roemerman | G06N 20/20 |

OTHER PUBLICATIONS

Kritzinger, Werner, Matthias Karner, Georg Traar, Jan Henjes, and Wilfried Sihn. "Digital Twin in manufacturing: A categorical literature review and classification." (IFAC, 2018). IFAC—PapersOnLine 51, No. 11 pp. 1016-1022. (Year: 2018).*

Kourakos, George, and Aristotelis Mantoglou. "Pumping optimization of coastal aquifers based on evolutionary algorithms and surrogate modular neural network models." (Elsevier, 2009) Advances in water resources 32, No. 4: 507-521. doi:10.1016/j.advwatres.2009.01.001 (Year: 2009).*

Palmé, Thomas, et al. "Hybrid modeling of heavy duty gas turbines for on-line performance monitoring." (American Society of Mechanical Engineers, 2014) ASME Turbo Expo 2014: Turbine Technical Conference and Exposition. vol. 6: Düsseldorf, Germany. V006T06A011. https://doi.org/10.1115/GT2014-26015 (Year: 2014).*

Zhang, Jie, et al. "Adaptive hybrid surrogate modeling for complex systems." (AIAA, 2013) vol. 51, No. 3. Mar. 2013: 643-656. https://doi.org/10.2514/1.J052008 (Year: 2013).*

Gorissen, Dirk. "Grid-enabled adaptive surrogate modeling for computer aided engineering". (Proquest, 2010) Universiteit Antwerpen (Belgium) ProQuest Dissertations Publishing 2010. 3416412. ISBN 978-90-8578-350-3. (Year: 2010).*

Alzghoul, Ahmad. "Mining data streams to increase industrial product availability." (DIVA, 2013). PhD diss., Luleå tekniska universitet, 2013. (Year: 2013).*

Shahapurkar, Som. Crossing the chasm: Deploying machine learning analytics in dynamic real-world scenarios. Arizona State University, 2016. (Year: 2016).*

Pruett, W. Andrew et al., "The Creation of Surrogate Models for Fast Estimation of Complex Model Outcomes", PLOS One, Jun. 3, 2016, DOI: 10.1371/journal.pone.0156574, (pp. 1-11, 11 total pages).

Salem, Malek Ben et al., "Automatic selection for general surrogate models", Structural and Multidisciplinary Optimization, vol. 58, Issue: 2, Aug. 2018, (pp. 719-734, 12 total pages).

* cited by examiner

| INDUSTRIAL ASSET IDENTIFIER 902 | SCRIPTED MODEL WORKFLOW 904 | SUBJECT MATTER EXPERT IDENTIFIER 906 | SURROGATE MODEL 908 | RANGE OF OPERATING POINTS 910 | RELEASE DATE 912 | STATUS 914 |
|---|---|---|---|---|---|---|
| IA_101 | TEXT.TXT | U_101 | link | | 12/1/2020 | RETIRED |
| IA_101 | link | U_101 | URL | | 12/15/2020 | RUNNING IN FIELD |
| IA_102 | EXECUTABLE | U_101 | FILE | | 1/10/2021 | IN PROCESS |
| IA_103 | TEXT.TXT | U_102 | POINTER | | 1/30/2021 | UPDATED |

AUTONOMOUS SURROGATE MODEL CREATION PLATFORM

BACKGROUND

An enterprise may create one or more digital models of an industrial asset. For example, an enterprise might create physics-based models associated with a gas turbine engine to predict maintenance requirements, future performance, etc. Note, however, that the execution of the physics-based models might not be practical in connection with a substantially real-time process (e.g., the physics-based models might take too long to execute). To address this issue, a machine learning process may be used to create a "surrogate" digital model of the industrial asset. When creating the surrogate digital model, a subject matter expert familiar with the industrial asset and the physics-based model may manually select appropriate solution points, map physics-based model inputs and outputs, format and translate data as appropriate, etc. Such an approach can be a time-consuming, expensive, and error-prone process. It would therefore be desirable to create surrogate models for an industrial asset in an automatic and accurate manner.

SUMMARY

According to some embodiments, a surrogate model creation computer system includes a user interface to interact with a subject matter expert to create a scripted physics-based model workflow associated with an industrial asset. The surrogate model creation computer system further includes a surrogate model creation engine to automatically execute the scripted physics-based model workflow, in connection with a physics-based model of the industrial asset, to generate at least one response surface of the physics-based model workflow. The surrogate model creation engine may then use the response surface and a machine learning process to automatically create a surrogate model of the industrial asset. It may then be arranged to output the surrogate model for use by a substantially real-time analytics package associated with the industrial asset. According to some embodiments, scripting for a physics-based model workflow may also be automatically created.

Some embodiments comprise: means for interacting with a subject matter expert via a user interface to create a scripted physics-based model workflow associated with an industrial asset; means for automatically executing, by a surrogate model creation engine, the scripted physics-based model workflow, in connection with a physics-based model of the industrial asset, to generate at least one response surface of the physics-based model workflow; means for using the response surface and a machine learning process to automatically create a surrogate model of the industrial asset; and means for arranging to output the surrogate model to be used by a substantially real-time analytics package associated with the industrial asset. According to some embodiments, means for validating accuracy of a surrogate model may compare the surrogate model with the physics-based model may be provided prior to outputting the surrogate model. In some embodiments, means for storing a validated surrogate model within a data repository may include provenance information for future access by other consumers of that model's function.

Some technical advantages of some embodiments disclosed herein are improved systems and methods to create surrogate models for an industrial asset in an automatic and accurate manner.

DETAILED DESCRIPTION

In the following detailed description, numerous specific details are set forth in order to provide a thorough understanding of embodiments. However, it will be understood by those of ordinary skill in the art that the embodiments may be practiced without these specific details. In other instances, well-known methods, procedures, components and circuits have not been described in detail so as not to obscure the embodiments.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
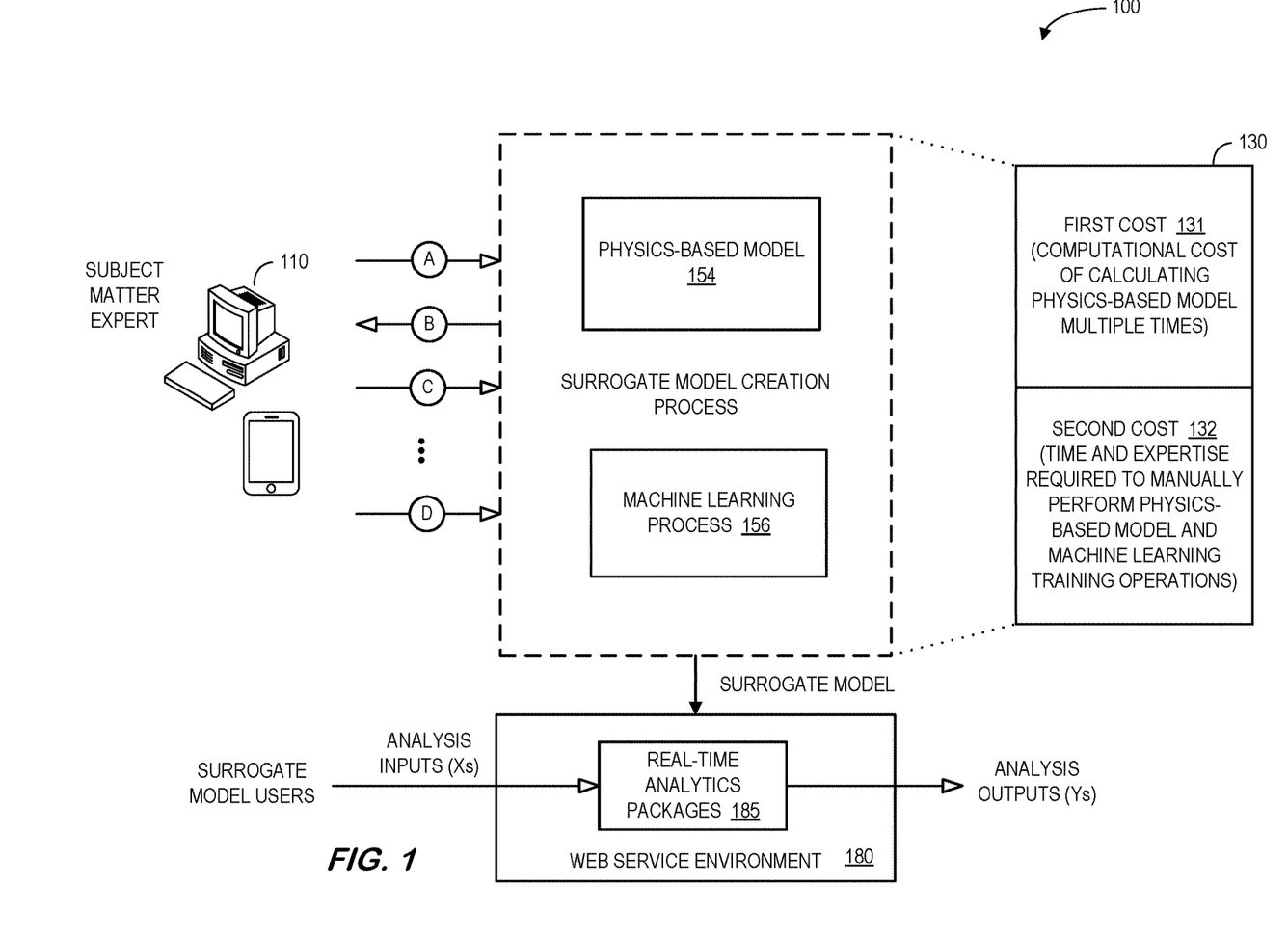
FIG. 1 is a high-level block diagram of a traditional system to create and use a surrogate model.

FIG. 1 is a high-level block diagram of a traditional system 100 to create and use a "surrogate model" to be used by real-time analytics packages 185 (e.g., in a web service environment 180) in connection with an industrial asset. As used herein, the phrase "surrogate model" may refer to a simulation model that results when machine learning 156 algorithms are applied to training data that was generated by a traditional "physics-based model" 154 simulation. As used herein, the phrase "physics-based model" 154 might refer to, for example, a model where first principal equations (and subsequent derivations based on them) are applied to solve an engineering problem of relevance. The physics-based model 154 might be as simple as a spreadsheet calculator or as complex as a massively parallel computational fluid dynamics problem. Note that the phrase "physics-based model" might refer to any physics-based model or tool chain. For example, a workflow might comprise geometry generation, followed by mesh generation, followed by pre-processing, followed by a physics-based solution, followed by post-processing, followed by a figure-of-merit output (that is, the workflow may represent more than simply a Computational Fluid Dynamics ("CFD") solution).

The primary advantage of the surrogate model is in its speed. While the physics-based model 154 can take a substantially long period of time to execute (e.g., days, weeks, or months depending on the complexity of the problem being solved), the surrogate model may execute nearly instantaneously (e.g., seconds or minutes) regardless of the complexity of the underlying physics-based model 154 that it reproduces. This expedience may open new opportunities for high-fidelity engineering simulation applications in areas where time limitations would not have previously allowed. By way of examples, the real-time analytics packages 185 might be associated with engineering controls applications, edge computing applications, new-make inspection analytics associated with manufacturing quality assurance, multidisciplinary design optimizations, etc. Typically, these types of applications required physics-based models that are "reduced order models" (i.e., using simplified physical assumptions to make the model execute fast enough for the short timescales required by such applications). With surrogate modeling, however, the full fidelity physics-based model can be deployed for the applications that require "real time" model throughputs.

Another advantage of a surrogate model is portability. Historically, the execution of more complex physics-based models depended on interactions with subject matter experts 110 to establish a new solution point. For example, the expert 110 might define initial parameters at (A), receive information about available models at (B), map various inputs and outputs as appropriate at (C), etc. before completing the machine learning process 156 at (D). According to some embodiments described herein, the expert 110 will no longer provide a single solution point, but instead will provide a trained surrogate model that reproduces an entire space of solution points and is executable by non-experts and/or by digital models directly.

There are two primary costs 130 associated with creating a surrogate model: a first cost 131 represents the computational cost of calculating the physics-based model 154 multiple times within the range of the operating inputs over which the surrogate model will operate; and a second cost 132 representing the time and expertise required to manually perform both the physics-based model 154 and the machine learning process 156 training operations. Note that the costs 130 may be associated with a feedback loop (having validation and repeat costs) associated with validating the surrogate model's accuracy at reproducing the physics-based model 154.

Some embodiments described herein provide an autonomous surrogate model creation platform to help reduce the second cost 132. Indirectly, the first cost 131 may also be reduced in that the building of the surrogate model may require the creation of an engineering simulation workflow (also known as a design system integration). The workflow may represent a scripted, automated execution of an entire physics-based workflow toolchain. As a result, the time spent by the expert 110 in creating and solving the physics-based model 154 solution may become compartmentalized into a scripted process such that an engineer can "press go" and wait for the system to execute the script.

Figure 2:
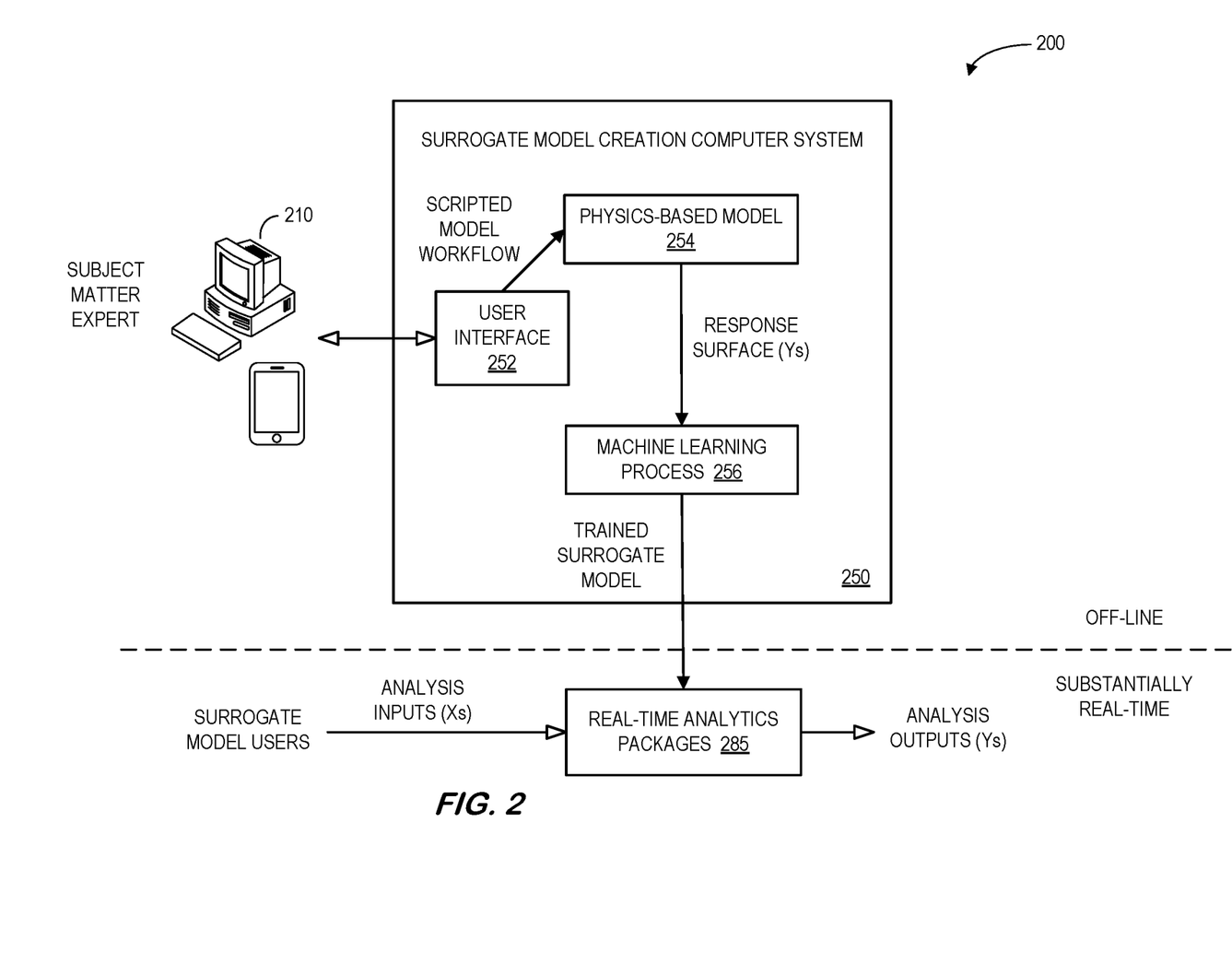
FIG. 2 is a high-level block diagram of an autonomous surrogate model creation system that may be provided in accordance with some embodiments.

FIG. 2 is a high-level block diagram of an autonomous surrogate model creation system 200 that may be provided in accordance with some embodiments. In particular, the system 200 includes a surrogate model creation computer system 250 associated with an enterprise that executes a user interface 252. A subject matter expert device 210 (e.g., a remote PC) may interact with the user interface 252 to create and/or store a scripted model workflow. The surrogate model creation computer system 250 may store information into and/or retrieve information from various data stores or sources in connection with the user interface 252 and/or other components. The surrogate model creation computer system 250 may exchange information with the expert device 210 via a communication port and/or firewall. Based on the scripted model workflow (including, according to some embodiments, input "X" values), the surrogate model creation computer system 250 may execute a physics-based model 254 to create a response surface result or output (e.g., "Y" values). The physics-based model might be associated with, for example, Finite Element Method ("FEM") and/or Finite Element Analysis ("FEA") techniques. The response surface may be used by a machine learning process 256 "off-line" to create a trained surrogate model for substantially real-time analytics packages 285. As used herein, the phrase "machine learning" might refer to, for example, techniques associated with polynomial response surfaces, kriging, Gradient-Enhanced Kriging ("GEK"), radial basis function, support vector machines, space mapping, and artificial neural networks, etc. Note that the machine learning process might itself be associated with execution of a scripted computing process. According to some embodiments, multiple techniques may be applied in parallel and the system 200 may recommend which is approach is most appropriate for or is best suited to accurately reproduce a particular physics-based workflow's response surface.

The surrogate model creation computer system 250 and/or the other elements of the system 200 might be, for example, associated with a Personal Computer ("PC"), laptop computer, smartphone, an enterprise server, a server farm, cloud services, and/or a database or similar storage devices. According to some embodiments, an "automated" surrogate model creation computer system 250 (and/or other elements of the system 200) may facilitate the creation of surrogate models. As used herein, the term "automated" may refer to, for example, actions that can be performed with little (or no) intervention by a human.

As used herein, devices, including those associated with the surrogate model creation computer system 250, and any other device described herein, may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

Although a single surrogate model creation computer system 250 is shown in FIG. 2, any number of such devices may be included. Moreover, various devices described herein might be combined according to embodiments of the present invention. For example, in some embodiments, the surrogate model creation computer system 250 and the real-time analytics packages 285 might be co-located and/or may comprise a single apparatus.

Thus, the system 200 may autonomously create a machine learning surrogate model replacement for any engineering simulation workflow that can be scripted. Moreover, a fleet of simulation-based surrogate models may be deployed across an enterprise. By making the machine learning surrogate model creation autonomous, the first cost 131 described with respect to FIG. 1 may be reduced or even eliminated. The creation of the scripted model workflow may be useful for the subsequent creation of future surrogate models. As a result, cost may be reduced via templated and archived practices—which may help to address the second cost 132 over time. According to some embodiments, templating and archiving of scripted practices may be performed.

Figure 3:
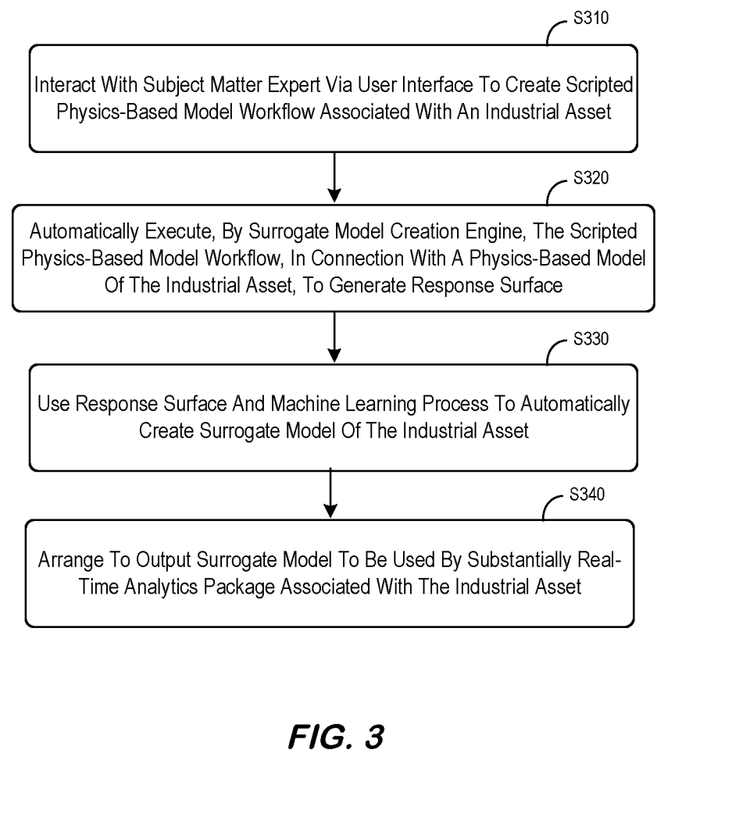
FIG. 3 is a surrogate model creation method according to some embodiments.

FIG. 3 illustrates a model creation method that might be performed by some or all of the elements of the system 200 described with respect to FIG. 2. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At S310, the system may interact with a subject matter expert via a user interface to create a scripted physics-based model workflow associated with an industrial asset. According to some embodiments, the scripted physics-based model workflow is associated with a plurality of high-fidelity physics-based models (e.g., an airflow model, a heat transfer model, a thermal distribution model, a material properties model, a mechanical load model, etc.). By way of examples only, the workflow might be associated with a component level model, a module level model, or a system level module. Moreover, the model might be associated with data that varies in space and/or time, include a set of input parameters (e.g., one hundred Computer Aided Design ("CAD") geometric parameters, post-processing, etc.

At S320, a surrogate model creation engine may automatically execute the scripted physics-based model workflow, in connection with a physics-based model of the industrial asset, to generate at least one response surface of the physics-based model workflow. Using the response surface and a machine learning process, at S330 the system may automatically create a surrogate model of the industrial asset. The surrogate model may be, according to some embodiments, associated with a defined space of solution points. As described with respect to FIG. 6, in some cases the surrogate model creation engine may create a training Design Of Experiment ("DOE") collection of operating points and a validation DOE collection of operating points different than the training DOE collection of operating points.

At S340, the system may arrange to output the surrogate model to be used by a substantially real-time analytics package associated with the industrial asset. By way of examples only, the substantially real-time analytics package might be associated with an engineering control application, an edge computing application, inspection analytics for manufacturing quality assurance, multi-disciplinary design optimization, etc. According to some embodiments, the system may validate accuracy of a surrogate model by comparing the surrogate model with the physics-based model prior to outputting the surrogate model. In some embodiments, a validated surrogate model may be stored within a data repository including provenance information to facilitate future access by other consumers of that model's function.

Figure 4:
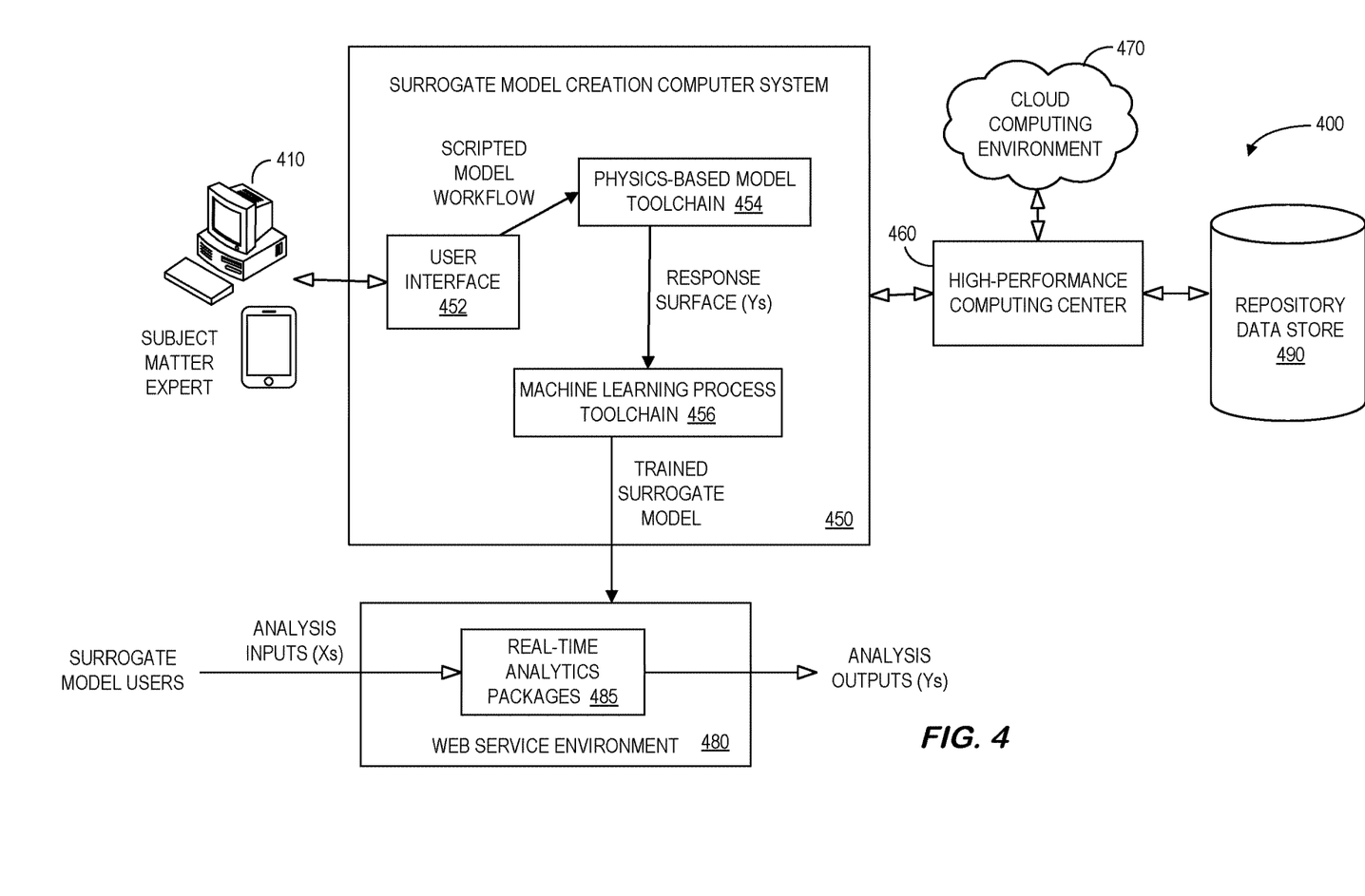
FIG. 4 illustrates a system having a repository data store in accordance with some embodiments.

FIG. 4 illustrates a system 400 having a repository data store 490 in accordance with some embodiments. As before, a surrogate model creation computer system 450 may include a user interface 452 that interacts with a subject matter expert device 410 to create a scripted model workflow that may be executed via a physics-based model toolchain 454 (e.g., to create response surfaces) and a machine learning process toolchain 456 to generate a trained surrogate model. The surrogate model may then be used by surrogate model users via real-time analytics packages 485 (e.g., in a web services environment 480). According to this embodiment, the surrogate model creation computer system 450 may load the scripted model workflow into the repository data store 490 for subsequent access and modification. The repository data store 490 might also contain metadata about the scripted physics-based model workflow, such as an industrial asset identifier, a user identifier, a software tool identifier, an operating point, a range of operating points, a release date, a release version, uncertainty data, etc.

According to some embodiments, the repository data store 490 may provide advanced database capabilities for the system 400. For example, when the surrogate model creation computer system 450 is used to create a scripted model workflow, the workflow may be stored in a searchable database for future consumption (e.g., by other subject matter experts). For example, other subject matter experts might modify the workflow, tweak the inputs, expand the inputs, extract more outputs, etc. and select "Update" via the user interface 452. The system 400 may then automatically updates DOE operating points and subsequent surrogate models as appropriate. Similar surrogate models and/or workflows may, according to some embodiments, be linked together within the database via common features. The workflows in the database may also be referenced back to preferred machine learning strategies (for that type of workflow) based on prior captured experiences and/or best practice from similar workflows. Eventually a subject matter expert may not need to build a workflow from scratch, but instead access prior experience and learning that will make subsequent builds more efficient. Similarly, a new expert may use information created by a previous expert (days or years prior). According to some embodiments, the inputs, outputs, and intermediate files from a workflow or DOE are also captured within the database. Similarly, a surrogate model itself might be captured in the database, with provenance, searchability, etc. Note that the database may be localized or distributed. For example, simulation data might be stored in a distributed fashion (e.g., in the cloud computing environment 470) while the metadata (describing the simulation data) is stored locally at the repository data store 490. According to some embodiments, "runners" (e.g., an automated process) may be applied to a database. The runners may, for example, constantly scan and check for file updates. When a file is updated, the runners may automatically determine files that exist downstream of the updated file (e.g., in the form of physics-based workflows, DOE response surfaces, trained surrogate models, etc.). The runners may also automatically update downstream files without input from an engineering subject matter expert. As a result, when a subject matter expert wants to access a surrogate model in the database at a later time, the subject matter will have been already updated in the system.

Historically, this subject matter expert would be contracted to provide an end consumer a single solution point for a particular application of the physics-based model. According to some embodiments described herein, the subject matter expert instead creates and/or provides a script to the surrogate model creation computer system 250 (e.g., via the user interface 452). In the early days of a new product, those scripts may be mostly hand-made and the amount of engineering labor may be substantial. As the product evolves, templates and best practices for the common scripts will be established and databased within the repository data store 490. As a result, subsequent surrogate models for "similar" applications may be expedited. Upon supplying the script, any required operating ranges, and any required accuracy to the system 250, the user's interaction is completed and the system 250 may proceed to autonomously create the surrogate model via a high-performance computing center 460 and/or a cloud computing environment 470.

Thus, the surrogate model creation computer system 250 and the high-performance computing center 260 may be closely integrated. The system 450 may essentially become a front end for consumers of those high-performance computing services to help them enable business outcomes around industrial assets (i.e., better designs, faster design cycles, more scientific product management, faster Root Cause Analysis ("RCA") and other failure analyses based on field issues, etc.).

Figure 5:
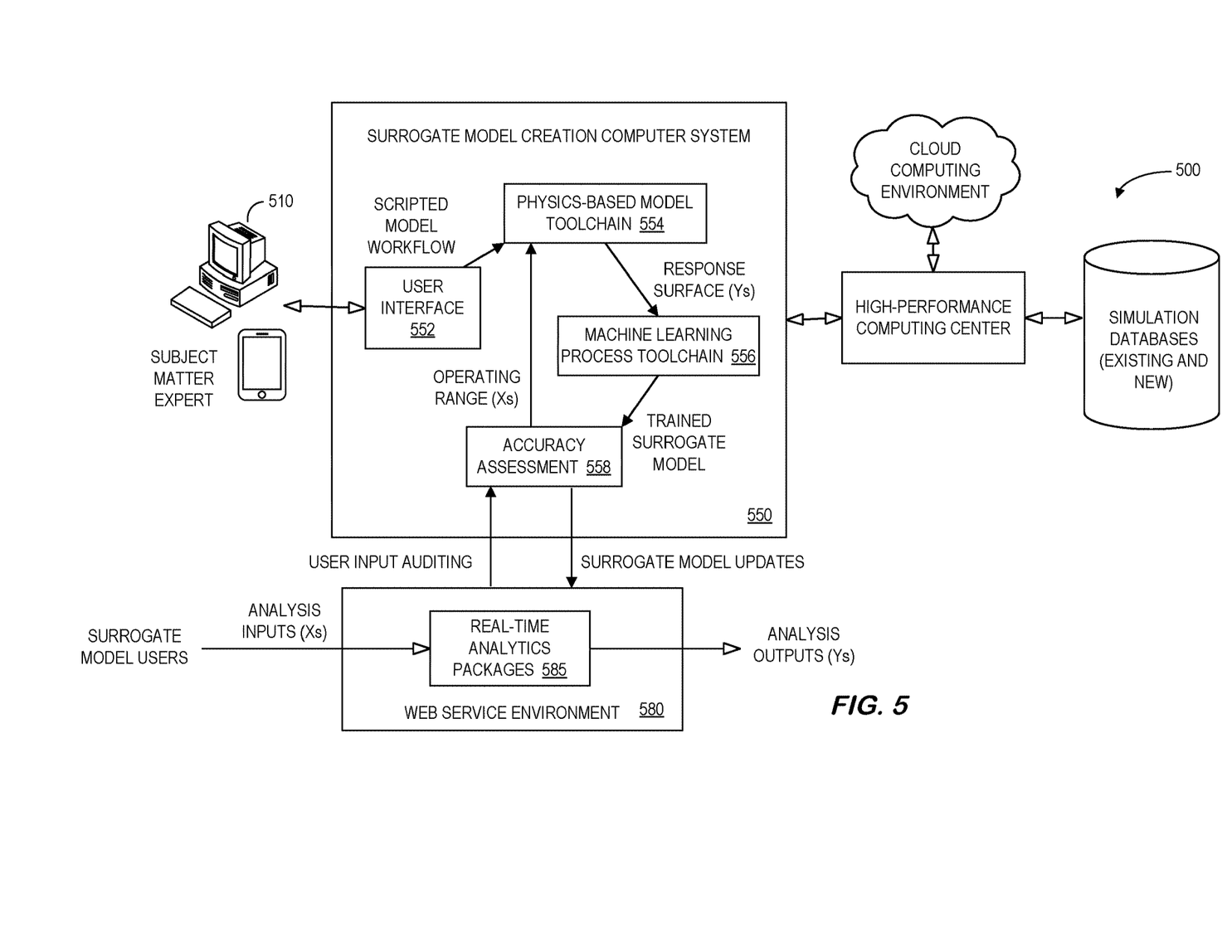
FIG. 5 illustrates a system implementing accuracy assessment according to some embodiments.

FIG. 5 illustrates a system 500 implementing accuracy assessment 558 according to some embodiments. As before, a surrogate model creation computer system 550 may include a user interface 552 that interacts with a subject matter expert device 510 to create a scripted model workflow that may be executed via a physics-based model toolchain 554 (e.g., to create response surfaces) and a machine learning process toolchain 556 the generates a trained surrogate model. The surrogate model may then be used by surrogate model users via real-time analytics packages 585 (e.g., in a web services environment 580). According to this embodiment, the surrogate model creation system 550 also receives subsequent audit information associated with operation of the industrial asset. The system may then update the surrogate model based on an accuracy assessment 558 of the audit information (e.g., to improve performance of the model and/or the creation of future models).

According some embodiments, a piece of input data "A" may be used in part to generate a workflow and subsequent surrogate model and a history of this relationship may be stored by the system 500. If the input data "A" is replaced with a new version of that data file, the system 500 may automatically determine that downstream workflows and surrogate models may need to be updated. These might then be updated automatically or a user might receive a warning that a surrogate model may be obsolete and needs to be manually updated.

Figure 6:
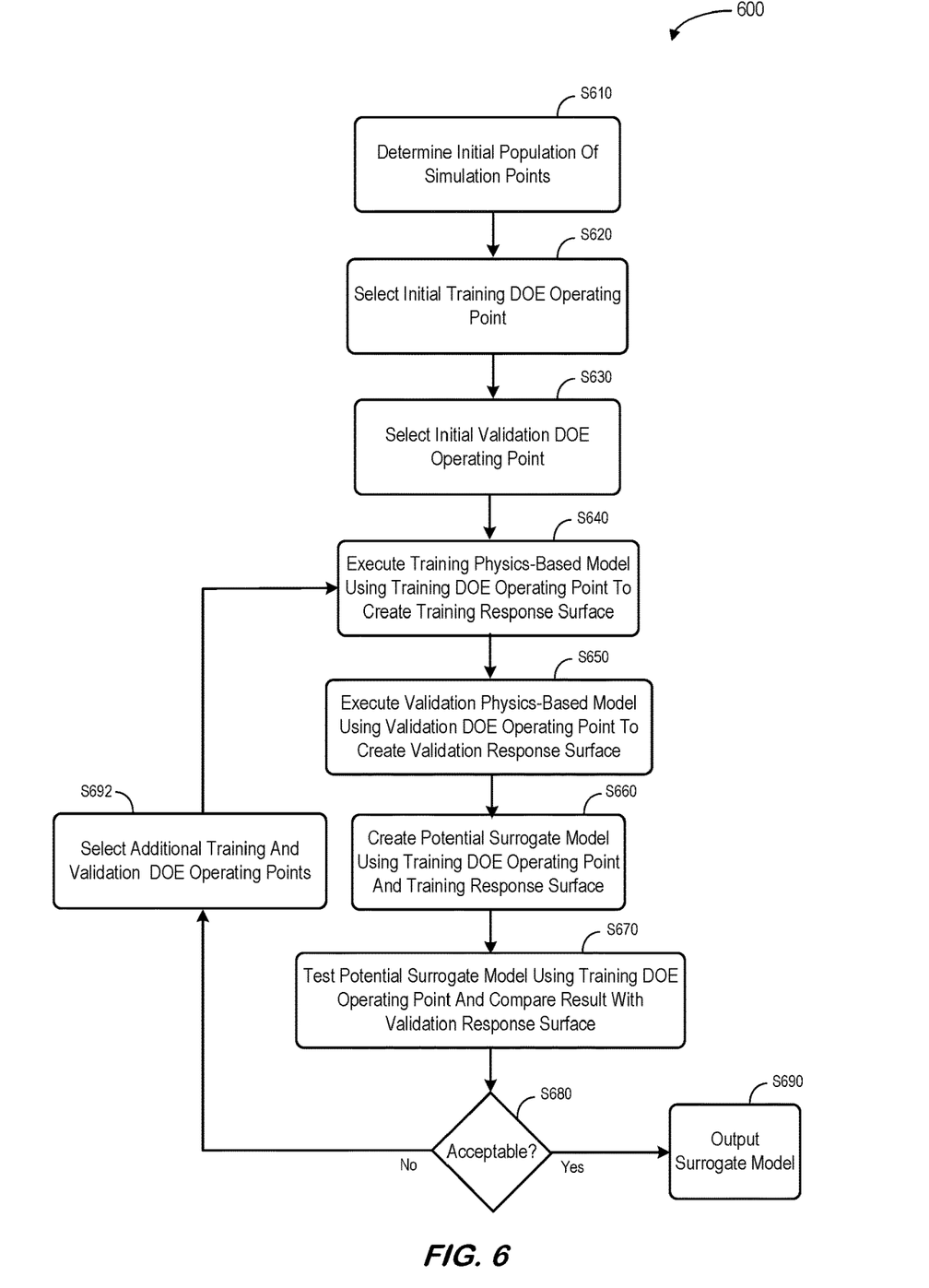
FIG. 6 is a method in accordance with some embodiments.

FIG. 6 is a method 600 in accordance with some embodiments. At S610, an autonomous surrogate model creation system may create an initial population of simulation points associated with surrogate model training. This population of simulation points may be associated with a DOE process (even when referring to simulation "experiments" and not necessarily true physical experiments). In particular, two DOEs may execute during each loop of the system training: a training DOE at S620 and a validation DOE at S630. The two DOEs may have distinctly different specific operating points (but still encompass the same ranges of the input parameters (i.e., X's). Note that the X's and the range of their operations may have previously been provided along with the design system integration script input.

Both DOEs may be executed expediently at S640 and S650 using high-performance computing systems (e.g., either locally adjacent or via a cloud/web computing service). As such, this system becomes a consumer of high-performance computing resources (rather than a SME). The resultant response surfaces from both DOEs may be stored in a locally-available database (where they can then be accessed for machine learning and surrogate model training). The training DOE response surface is subsequently consumed by the machine learning training calculations at S660—which can also be performed by consuming either local or cloud/web high-performance computing resources consumed. The trained surrogate model may then be applied on the validation DOE solution inputs, and the surrogate model outputs (Y's) may be compared against the validation DOE outputs (Y's) at S670 to assess the accuracy of the surrogate model. If the accuracy is acceptable at S680, the surrogate model is ready for use and may be output at S690. if the accuracy is not acceptable at S680, additional DOE points are defined at S692 based on areas of inaccuracy (both for training and validation), and the process repeats itself at S640. In various embodiments, the validation DOE results from one pass through the process may be recycled for training DOE data in subsequent passes.

When an acceptable agreement between the PB model and the surrogate model is achieved at S680, the trained surrogate model can be deployed to its end consumers at S690 (e.g., human and/or software consumers). The surrogate model may, according to some embodiments, be stored and archived for future consumption by end users along with descriptive metadata (e.g., X's, range of X's, software tools used in the script, release dates and versions of the software, an uncertainty quantification against the physics-based model, product information associated with the inputs to the model, the name of a subject matter expert, etc.). According to some embodiments, a feedback process and/or internal system logic may identify and decide where a next wave of DOE operating points should be positioned in the response surface space. Such an approach may facilitate a more accurate surrogate model prediction (accurate relative to the physics model).

Additionally, the system may monitor the usage of the surrogate models by end consumers. If the system finds that a surrogate model is being used out of range of the X's it was trained on, the system may automatically trigger generation of new DOE points (and trains an updated surrogate model as previously described). Likewise, if a user decides to add new X's to the surrogate model, the system may handle updates to the surrogate model in a similar fashion. In this way, when field experience with an industrial asset doesn't match expected behavior the surrogate model can simply be re-trained and re-calibrated (without needing to conduct a time-consuming investigation into potential anomalies in the underlying physics-based model). Note that such a feedback loop may be driven in a largely autonomous fashion with little or no input from subject matter experts.

Figure 7:
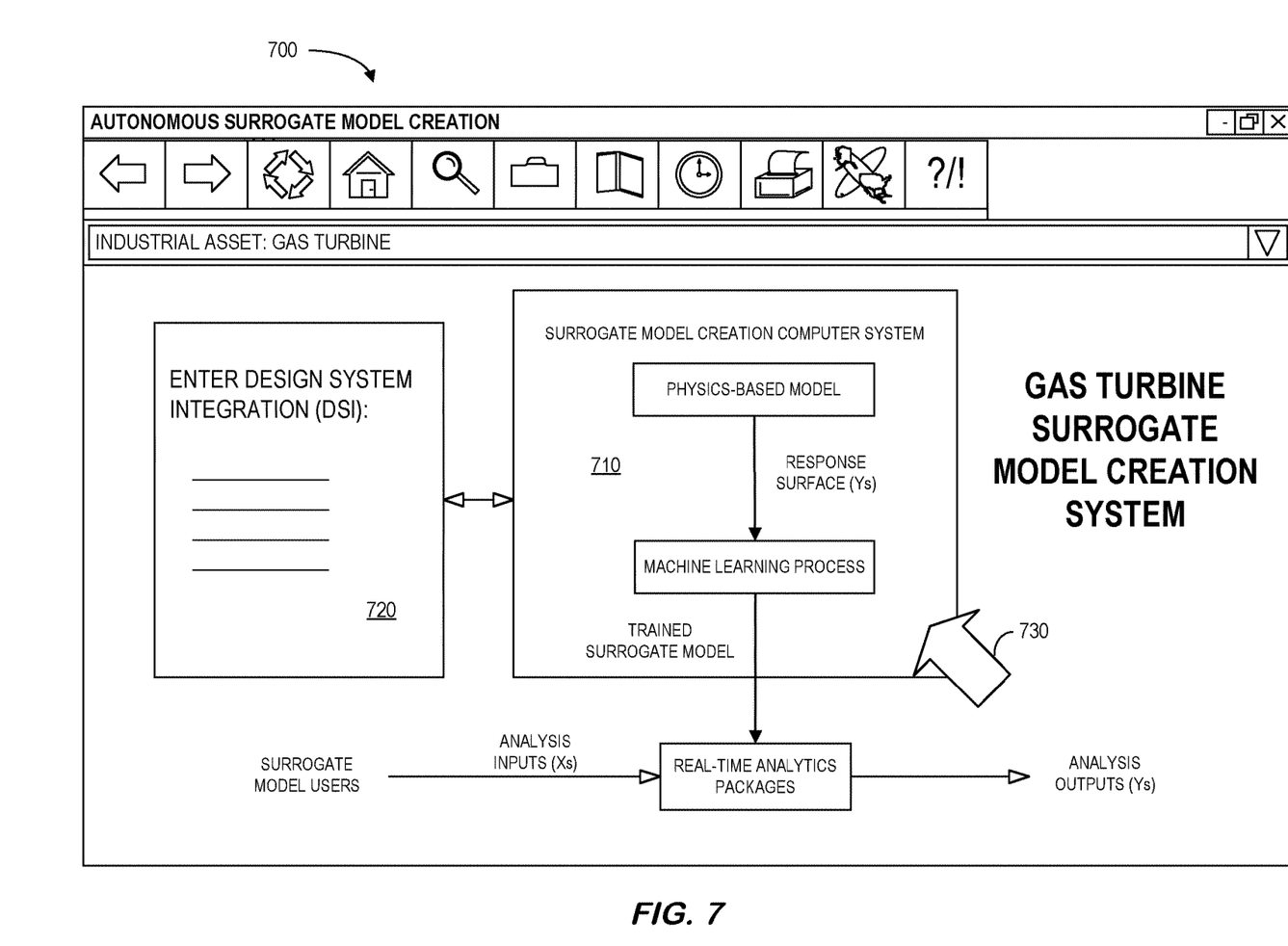
FIG. 7 is a surrogate model creation system display in accordance with some embodiments.

FIG. 7 is a surrogate model creation system display 700 in accordance with some embodiments. The display 700 provides a graphical depiction 710 to an operator and/or to an interactive interface allowing the operator to adjust system components as appropriate. For example, selection of an item on the display 700 (e.g., via a touchscreen or computer mouse pointer 730) may let the operator see more information about that particular item and/or adjust operation of that item (e.g., by altering parameters of a physics-based model). According to some embodiments, the display 700 further includes a design system integration input area 720 where a subject matter expert can define a script.

Figure 8:
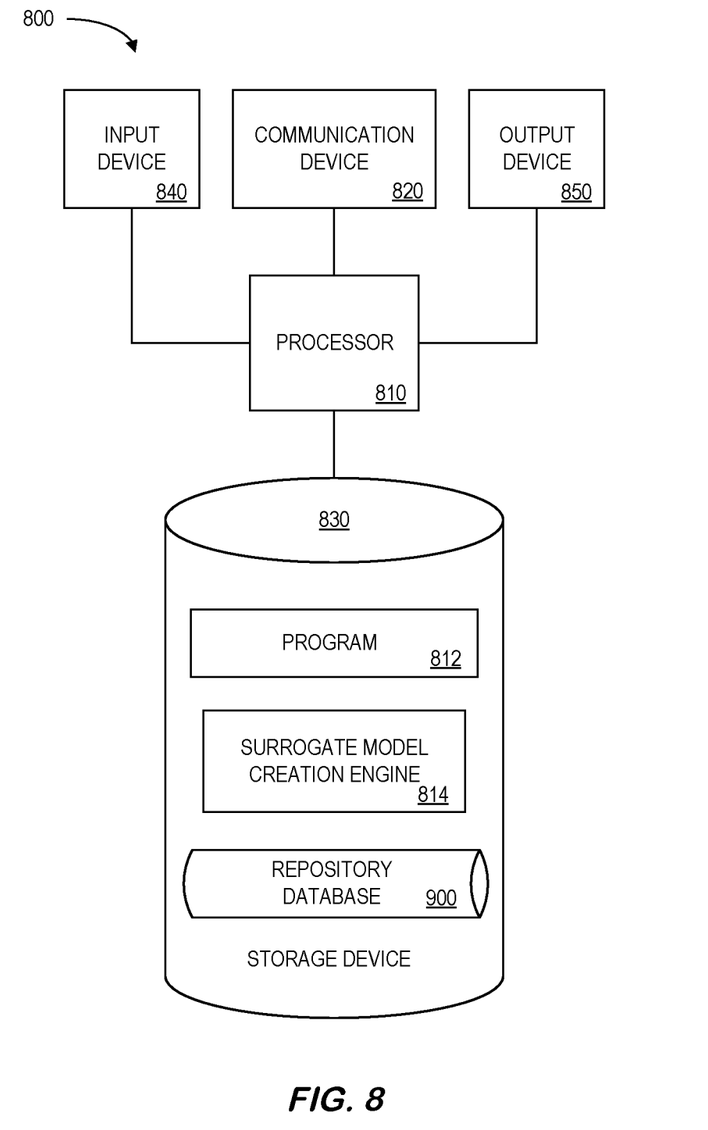
FIG. 8 is a surrogate model creation apparatus according to some embodiments.

Note that the embodiments described herein may be implemented using any number of different hardware configurations. For example, FIG. 8 is a block diagram of a surrogate model creation apparatus 800 that may be, for example, associated with the system 200 of FIG. 2 and/or any other system described herein. The surrogate model creation apparatus 800 comprises a processor 810, such as one or more commercially available Central Processing Units ("CPUs") in the form of one-chip microprocessors, coupled to a communication device 820 configured to communicate via a communication network (not shown in FIG. 8). The communication device 820 may be used to communicate, for example, with one or more remote subject matter expert devices, high-performance computing centers, digital twins, etc. The surrogate model creation apparatus 800 further includes an input device 840 (e.g., a computer mouse and/or keyboard to input scripts and/or modeling information) and/an output device 850 (e.g., a computer monitor to render a display, list available script templates, transmit recommendations, and/or create reports). According to some embodiments, a mobile device, a real-time analytics package, and/or a PC may be used to exchange information with the surrogate model creation apparatus 800.

The processor 810 also communicates with a storage device 830. The storage device 830 may comprise any appropriate information storage device, including combinations of magnetic storage devices (e.g., a hard disk drive), optical storage devices, mobile telephones, and/or semiconductor memory devices. The storage device 830 stores a program 812 and/or surrogate model creation engine 814 for controlling the processor 810. The processor 810 performs instructions of the programs 812, 814, and thereby operates in accordance with any of the embodiments described herein. For example, the processor 810 may execute a user interface to interact with a subject matter expert and define a scripted physics-based model workflow associated with an industrial asset. The processor 810 may further contain a surrogate model creation engine that automatically executes the scripted physics-based model workflow, in connection with a physics-based model of the industrial asset, to generate at least one response surface of the physics-based model workflow. The processor 810 may then use the response surface and a machine learning process to automatically create a surrogate model of the industrial asset. It may then be arranged to output the surrogate model for use by a substantially real-time analytics package associated with the industrial asset. According to some embodiments, scripting for a physics-based model workflow may also be automatically created.

The programs 812, 814 may be stored in a compressed, uncompiled and/or encrypted format. The programs 812, 814 may furthermore include other program elements, such as an operating system, clipboard application, a database management system, cloud computing capabilities, and/or device drivers used by the processor 810 to interface with peripheral devices.

As used herein, information may be "received" by or "transmitted" to, for example: (i) the surrogate model creation apparatus 800 from another device; or (ii) a software application or module within the surrogate model creation apparatus 800 from another software application, module, or any other source.

In some embodiments (such as the one shown in FIG. 8), the storage device 830 further stores a repository database 900. An example of a repository database 900 that may be used in connection with the surrogate model creation apparatus 800 will now be described in detail with respect to FIG. 9. Note that the database described herein is only one example, and additional and/or different information may be stored therein. Moreover, various databases might be split or combined (and or implemented via a cloud computing environment) in accordance with any of the embodiments described herein.

Figure 9:
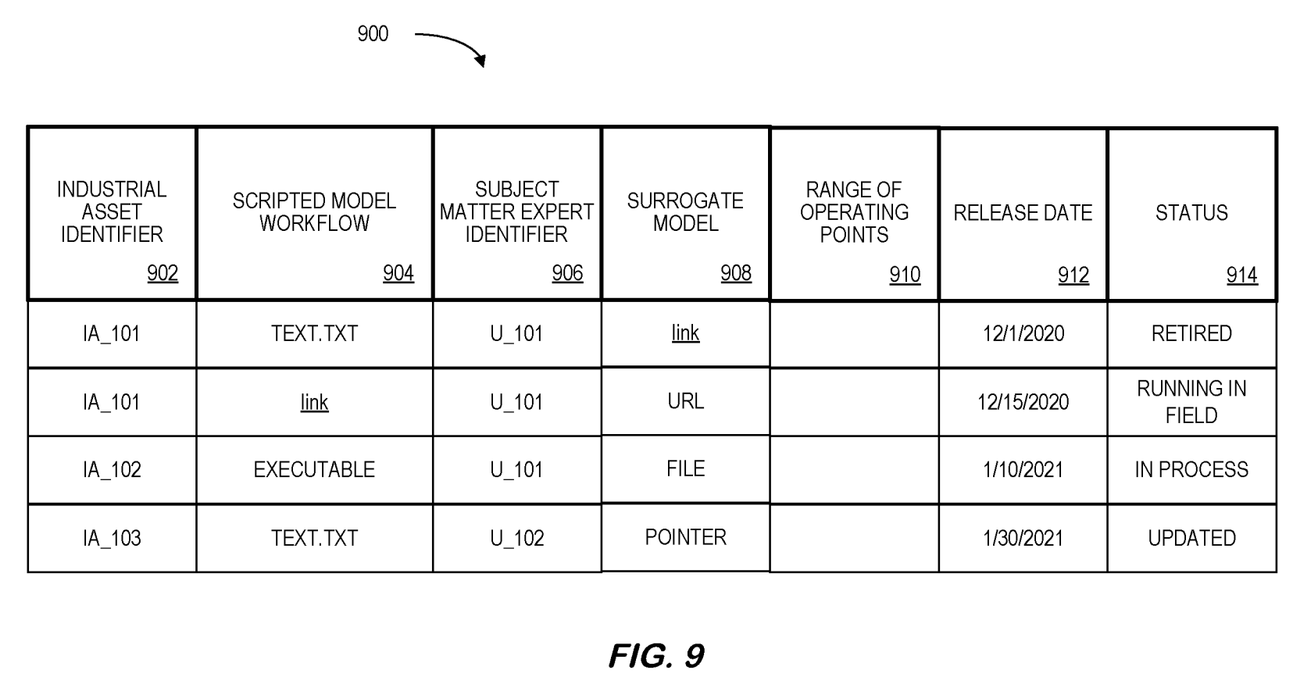
FIG. 9 is portion of a tabular repository database in accordance with some embodiments.

Referring to FIG. 9, a table is shown that represents the repository database 900 that may be stored at the surrogate model creation apparatus 800 according to some embodiments. The table may include, for example, entries identifying industrial assets. The table may also define fields 902, 904, 906, 908, 910, 912, 914 for each of the entries. The fields 902, 904, 906, 908, 910, 912, 914 may, according to some embodiments, specify: an industrial asset identifier 902, a scripted model workflow 904, a subject matter expert identifier 906, a surrogate model 908, a range of operating points 910, a release date 912, and a status 914. The repository database 900 may be created and updated, for example, off-line when a new physical system (e.g., industrial asset) is monitored or modeled.

The industrial asset identifier 902 may be a unique alpha-numeric code identifying and/or describing a physical system to be modeled. The scripted model workflow 904 might comprise a series of steps to be automatically performed in connection with creation of a surrogate model. The scripted model workflow 904 might, for example, comprise a text file, a link to a design system integration file, an executable file, etc. The subject matter expert identifier 906 might identify an author of the scripted model workflow 904. The surrogate model 908 might comprise, for example, a link to a model created using the results of a physics-based model and machine learning algorithms. The range of operating points 910 might comprise input parameters (X's) associated with the industrial asset. The release date 912 might define when the surrogate model 908 was created or last updated, a version number, etc. The status 914 might indicate that a particular model 908 is retired (e.g., no longer active because it has been superseded by an updated version), running in the field, in the process of being created, etc.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although specific hardware and data configurations have been described herein, note that any number of other configurations may be provided in accordance with embodiments of the present invention (e.g., some of the information associated with the databases described herein may be combined or stored in external systems). For example, although some embodiments are focused on specific types of industrial assets, any of the embodiments described herein could be applied to other types of industrial assets including wind turbines, gas turbine, additive manufacturing devices, electrical power grids and storage system, dams, locomotives, airplanes, consumer products, electronic devices, vehicles (including autonomous vehicles, automobiles, trucks, airplanes, drones, submarines, etc.). According to some embodiments, "walled gardens" may be provided within a surrogate model creation system such that groups of people's work product (e.g., databases, workflows, executing jobs, machine learning best-practices, etc.) can be segregated from one another within the system. Moreover, according to some embodiments a surrogate model creation system may let an operator add, remove, consolidate, etc. categories of product being simulated. Moreover, new categories may (or may not) be populated based on information in previous datasets (note that not all categories may correspond to all data files).

In some embodiments, external compute resources may be consumed by a surrogate model creation system. For example, a user may access the system with an external cloud computing account, setup a workflow, provide his or her account number and password, and select "Go." The system may then automatically arrange for DOE jobs to be run via that cloud-based computing resource. According to some embodiments, a license control scheme may be employed. For example, a simulation software package may be accessed by a user of the system with his or her own license file or key (e.g., which is entered that into the system). The system may detect how many licenses the user has and only launches DOE jobs within the limits of the available licenses. Consider, for example, a workflow that includes five software components, and the user has 5, 4, 3, 2, 1 licenses for each software component, respectively. In this case, the overall workflow may take 50%, 20%, 10%, 10%, 10% of the overall time with each of the five software components. Moreover, some embodiments may use optimization routines to decide how DOE jobs (and how many individual compute nodes) will be used so that the consumption of time and compute resources is minimal. Note that a workflow may be made up of several pre-existing workflows previously defined in the system (e.g., WorkflowNEW=Workflow1+Workflow2+Workflow3).

According to some embodiments, a system may later absorb new response surface data from a product in the field. Moreover, the system may subsequently update the surrogate model as appropriate. Note that a physics-based model might not be entirely accurate. For example, the physics-based model workflow can be considered a transfer function that produces a set of "Y's" for a given set of "X's". A product in the field might, however, will produce a second opinion of what "Y's" should be. The system may, according to some embodiments, be connected to databases of product data from the field and, when it determines that new information is available, the surrogate model may be updated and/or evolved accordingly based on that new data. In that way, the accuracy of the surrogate model relative to the product in the field may mature naturally over time as more and more product data becomes available.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

The invention claimed is:

1. A surrogate model creation computer system, comprising:
 a user interface operative to interact with a subject matter expert via a subject matter device, wherein an output of the interaction is a scripted physics-based model workflow associated with an industrial asset, the scripted physics-based model workflow comprising a series of automatically performable steps adapted to create a trained surrogate digital model of the industrial asset, wherein the trained surrogate digital model is a simulation model of the industrial asset; and
 a surrogate model creation engine, coupled to the user interface, adapted to:
  automatically execute the scripted physics-based model workflow, in connection with a physics-based model of the industrial asset, to generate at least one response surface of the scripted physics-based model workflow, the response surface including a plurality of solution points;
  train a surrogate digital model of the industrial asset using the response surface and a machine learning process to automatically create the trained surrogate digital model of the industrial asset;
  arrange to output the trained surrogate digital model for use by a substantially real-time analytics package associated with the industrial asset;
  constantly, via one or more runners, scan one or more databases of field product data for updated field data associated with the use of the trained surrogate digital model by the substantially real-time analytics package;
  automatically receive from the one or more databases of field product data, updated field data;
  automatically determine, by the runners, three or more downstream files that exist downstream of the updated databases, wherein a first of the three or more downstream files include the scripted physics-based model workflow, a second of the three or more downstream files include the response surface generated via execution of the scripted physics-based model workflow in connection with the physics-based model of the industrial asset and a third of the three or more downstream files include the trained surrogate model;
  automatically update the downstream files with the updated field data;
  determine, by the system, the updated field data is outside a range of input parameters used to generate the response surface;
  automatically generate a collection of new operating points;
  and
  automatically re-train the trained surrogate digital model with automatically generated collection of new operating points.

2. The system of claim 1, further comprising:
 a repository data store to contain the scripted physics-based model workflow for subsequent access and modification.

3. The system of claim 2, wherein the repository data store further contains at least one of: (i) metadata about the scripted physics-based model workflow, (ii) an industrial asset identifier, (iii) a user identifier, (iv) a software tool identifier, (v) an operating point, (vi) a range of operating points, (vii) a release date, (viii) a release version, and (ix) uncertainty data.

4. The system of claim 3, wherein the repository data store is a searchable database adapted to be accessed and updated by subject matter experts.

5. The system of claim 1, wherein the surrogate model creation engine is further configured to:
 receive subsequent audit information associated with operation of the industrial asset, and
 update the trained surrogate digital model based on an accuracy assessment of the audit information.

6. The system of claim 1, wherein at least one of the execution of the scripted physics-based model workflow and an execution of the machine learning process are associated with at least one of: (i) a high-performance computing center, and (ii) a cloud-based computing environment.

7. The system of claim 1, wherein the scripted physics-based model workflow is associated with a plurality of high-fidelity physics-based models.

8. The system of claim 1, wherein the scripted physics-based model workflow is associated with at least one of: (i) a component level model, (ii) a module level model, (iii) a system level module, (iv) data that varies in space, and (v) data that varies in time, (vi) input parameters, and (vii) post-processing.

9. The system of claim 1, wherein the substantially real-time analytics package is associated with at least one of: (i) an engineering control application, (ii) an edge computing application, (iii) inspection analytics for manufacturing quality assurance, and (iv) multi-disciplinary design optimization.

10. The system of claim 1, wherein the surrogate model is associated with a defined space of solution points.

11. The system of claim 1, wherein training the surrogate digital model of the industrial asset further comprises the surrogate model creation engine generating a first collection of training Design Of Experiment ("DOE") operating points and a first collection of validation DOE operating points different than the training DOE operating points; and
wherein re-training the trained surrogate digital model of the industrial asset further comprises generating a second collection of training DOE operating points.

12. The system of claim 1 further comprising:
a license control key configured to allocate components of the scripted physics-based model workflow to a cloud computing environment in accordance with software licenses associated with each component and an optimization routine.

13. A method associated with a surrogate model creation computer system, comprising:
interacting with a subject matter expert via a user interface of a subject matter device, wherein an output of the interaction is a scripted physics-based model workflow associated with an industrial asset, the scripted physics-based model workflow comprising a series of automatically performable steps adapted to create a trained surrogate digital model of the industrial asset, wherein the trained surrogate digital model is a simulation model of the industrial asset;
automatically executing, by a surrogate model creation engine, the scripted physics-based model workflow, in connection with a physics-based model of the industrial asset, to generate at least one response surface of the scripted physics-based model workflow, the response surface including a plurality of solution points;
training a surrogate digital model of the industrial asset using the response surface and a machine learning process to automatically create the trained surrogate digital model of the industrial asset;
arranging to output the trained surrogate digital model to be used by a substantially real-time analytics package associated with the industrial asset;
constantly, via one or more runners, scanning one or more databases of field product data for updated field data associated with the use of the trained surrogate digital model by the substantially real-time analytics package;
automatically receiving from the one or more databases of field product data, updated field data;
automatically determining, by the runners, three or more downstream files that exist downstream of the updated databases, wherein a first of the three or more downstream files include the scripted physics-based model workflow, a second of the three of more downstream files include the response surface generated via execution of the scripted physics-based model workflow in connection with the physics-based model of the industrial asset and a third of the three or more downstream files include the trained surrogate model;
automatically updating the downstream files with the updated field data;
determining, by the system, the updated field data is outside a range of input parameters used to generate the response surface;
automatically generating a collection of new operating points;
and
automatically re-training the trained surrogate digital model with the automatically generated collection of new operating points.

14. The method of claim 13, further comprising:
placing the scripted physics-based model workflow into a repository data store for subsequent access and modification.

15. The method of claim 13, further comprising:
receiving subsequent audit information associated with operation of the industrial asset; and
updating the trained surrogate digital model based on an accuracy assessment of the audit information.

16. A non-transitory, computer-readable medium storing instructions that, when executed by a computer processor, cause the computer processor to perform a method associated with a surrogate model creation computer system, the method comprising:
interacting with a subject matter expert via a user interface of a subject matter device, wherein an output of the interaction is a scripted physics-based model workflow associated with an industrial asset, the scripted physics-based model workflow comprising a series of automatically performable steps adapted to create a trained surrogate digital model of the industrial asset, wherein the trained surrogate digital model is a simulation model of the industrial asset;
automatically executing, by a surrogate model creation engine, the scripted physics-based model workflow, in connection with a physics-based model of the industrial asset, to generate at least one response surface of the scripted physics-based model workflow, the response surface including a plurality of solution points;
training a surrogate digital model of the industrial asset using the response surface and a machine learning process to automatically create the trained surrogate digital model of the industrial asset;
validating the trained surrogate digital model against the scripted physics-based model workflow;
arranging to output the trained surrogate digital model to be used by a substantially real-time analytics package associated with the industrial asset;
constantly, via one or more runners, scanning one or more databases of field product data for updated field data associated with the use of the trained surrogate digital model by the substantially real-time analytics package;
automatically receiving from the one or more databases of field product data, updated field data;
automatically determining, by the runners, three or more downstream files that exist downstream of the updated databases, wherein a first of the three or more downstream files include the scripted physics-based model workflow, a second of the three or more downstream files include the response surface generated via execution of the scripted physics-based model workflow in connection with the physics-based model of the industrial asset and a third of the three or more downstream files include the trained surrogate model;

automatically updating the downstream files with the updated field data;

determining, by the system, the updated field data is outside a range of input parameters used to generate the response surface;

automatically generating a collection of new operating points;

and automatically re-training the trained surrogate digital model with the automatically generated collection of new operating points.

17. The medium of claim 16, wherein the scripted physics-based model workflow is associated with a plurality of high-fidelity physics-based models.

18. The medium of claim 16, wherein the substantially real-time analytics package is associated with at least one of: (i) an engineering control application, (ii) an edge computing application, (iii) inspection analytics for manufacturing quality assurance, and (iv) multi-disciplinary design optimization.

19. The medium of claim 16, wherein the trained surrogate digital model is associated with a defined space of solution points and the surrogate model creation engine creates a collection of training Design Of Experiment ("DOE") operating points and a collection of validation DOE operating points different than the training DOE operating points.

20. The system of claim 1, wherein metadata about the scripted physics-based model workflow including at least one operating point is updated with updated field data.

* * * * *